United States Patent
Carney et al.

(10) Patent No.: US 9,469,781 B2
(45) Date of Patent: *Oct. 18, 2016

(54) MULTILAYER FILM

(71) Applicant: E I DU PONT DE NEMOURS AND COMPANY, Wilmington, DE (US)

(72) Inventors: Thomas Edward Carney, Orient, OH (US); Jeffrey Michael Bartolin, Westerville, OH (US); Christopher Robert Becks, Grove City, OH (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,850

(22) Filed: Dec. 10, 2014

(65) Prior Publication Data

US 2015/0166833 A1   Jun. 18, 2015

Related U.S. Application Data

(60) Provisional application No. 61/917,007, filed on Dec. 17, 2013.

(51) Int. Cl.
| | |
|---|---|
| C09D 179/08 | (2006.01) |
| B05D 7/00 | (2006.01) |
| B32B 27/28 | (2006.01) |
| C08J 7/04 | (2006.01) |
| C08K 3/36 | (2006.01) |
| C08K 3/04 | (2006.01) |
| C08K 3/22 | (2006.01) |

(52) U.S. Cl.
CPC ............. *C09D 179/08* (2013.01); *B05D 7/52* (2013.01); *B32B 27/281* (2013.01); *C08J 7/047* (2013.01); *B32B 2457/00* (2013.01); *C08J 2379/08* (2013.01); *C08J 2479/08* (2013.01); *C08K 3/04* (2013.01); *C08K 3/22* (2013.01); *C08K 3/36* (2013.01); *Y10T 428/24967* (2015.01)

(58) Field of Classification Search
None
See application file for complete search history.

(56) References Cited

U.S. PATENT DOCUMENTS

| | | | |
|---|---|---|---|
| 7,018,704 B2 | 3/2006 | Kaneshiro et al. | |
| 8,124,223 B2 | 2/2012 | Kanakarajan et al. | |
| 2007/0009751 A1 | 1/2007 | Hwang et al. | |
| 2007/0166535 A1 | 7/2007 | Lu et al. | |
| 2011/0039085 A1* | 2/2011 | Carney | C08J 5/18 428/220 |
| 2012/0141758 A1* | 6/2012 | Boussaad | C08J 5/18 428/220 |

(Continued)

FOREIGN PATENT DOCUMENTS

| | | | |
|---|---|---|---|
| EP | 0659553 a1 | * | 6/1995 |
| EP | 0659553 A1 | | 6/1995 |

(Continued)

OTHER PUBLICATIONS

Research Disclosure RD405061A, dated Jan. 10, 1998.
International Search Report and Written Opinion dated Mar. 16, 2015 for International Application No. PCT/US2014/069484.

*Primary Examiner* — Tahseen N Khan

(57) ABSTRACT

The present disclosure is directed to multilayer film having has an L* color less than 30 and a 60 degree gloss value less than 10. The multilayer film has a first polyimide layer and a second polyimide layer. The second polyimide layer has 25 to 50 wt % of a polyimide, greater than 0 and less than 20 wt % of a silica matting agent, greater than 0 and less than 20 wt % of at least one submicron carbon black and 15 to 50 wt % of at least one submicron fumed metal oxide.

22 Claims, 1 Drawing Sheet

(56) References Cited

U.S. PATENT DOCUMENTS

| | | | |
|---|---|---|---|
| 2012/0142825 A1* | 6/2012 | Boussaad | C08L 79/08 524/39 |
| 2012/0142826 A1* | 6/2012 | Boussaad | C08J 5/18 524/40 |
| 2013/0011645 A1 | 1/2013 | Carney et al. | |
| 2013/0029166 A1* | 1/2013 | Carney | C08J 5/18 428/473.5 |
| 2013/0065033 A1 | 3/2013 | Wu et al. | |
| 2014/0220335 A1 | 8/2014 | Lin et al. | |
| 2015/0166832 A1* | 6/2015 | Carney | B32B 7/00 428/215 |
| 2015/0166833 A1* | 6/2015 | Carney | B32B 27/281 428/215 |

FOREIGN PATENT DOCUMENTS

| | | |
|---|---|---|
| WO | 2010/101822 A1 | 9/2010 |
| WO | 2011/017291 A1 | 2/2011 |
| WO | WO2012011970 a * | 1/2012 |

* cited by examiner

MULTILAYER FILM

FIELD OF DISCLOSURE

This disclosure relates generally to a multilayer film. More specifically, the multilayer film has a first polyimide layer and a second polyimide layer containing a matting agent, submicron carbon black and submicron fumed metal oxide.

BACKGROUND OF THE DISCLOSURE

Industry increasingly desires polyimide films for electronic application to be matte in appearance, have a specific color, durability to handling and circuit processing, and when used as a coverlay, provide security against unwanted visual inspection of the electronic components protected by the coverlay. Single layer matte luster films do not have an L* color less than 30 providing deep, rich saturated colors desired by industry. Typically, as the amount of matting agent is increased the color of the film becomes muted. The effect of increased surface roughness from the matting agent is the dilution of the pigment color so that it appears lighter and less saturated. This is caused by the dilution of the diffuse reflectance (where pigment color is perceived) by the increased scatter of the specular reflectance (white light). The rougher the surface, the lower the gloss and greater the scatter of the specular reflectance. Thus, as gloss decreases, L* (lightness) typically increases. Adding more colorant does not decrease the L* color. Thus, simultaneously achieving low gloss and low L* color is therefore difficult.

For the forgoing reasons, a need exists for a polyimide film that is matte in appearance, has deep, rich saturated colors, as well as provide sufficient optical density to provide visual security when used as a coverlay while having acceptable electrical properties (e.g., dielectric strength) mechanical properties, and durability to handling and circuit processing.

SUMMARY

The present disclosure is directed to a multilayer film comprising:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
   i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
   ii) greater than 0 and less than 20 wt % of a silica matting agent or a mixture of silica matting agent with at least one additional matting agent;
   iii) greater than 0 and less than 20 wt % of at least one submicron carbon black;
   iv) 15 to 50 wt % of at least one submicron fumed metal oxide; and
wherein the multilayer film has an L* color less than 30 and a 60 degree gloss value less than 10.

DETAILED DESCRIPTION

Figure 1:
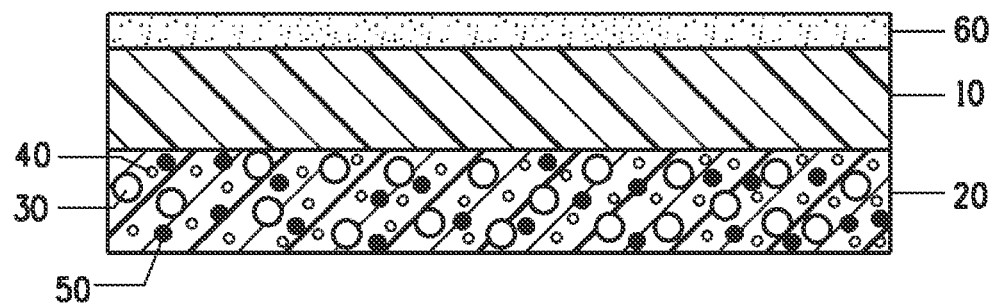
FIG. 1 illustrates an adhesive layer in direct contact with the first polyimide layer opposite from the second polyimide layer according to one embodiment of the present disclosure.

The present disclosure is directed to multilayer films that achieve a desired L* color of less than 30 and a 60 degree gloss of less than 10 while maintaining acceptable electrical properties, mechanical properties, and durability to handling and circuit processing. The multilayer film comprises a first polyimide layer and a second polyimide layer.

The use of the "a" or "an" are employed to describe elements and components of the invention. This is done merely for convenience and to give a general sense of the invention. This description should be read to include one or at least one and the singular also includes the plural unless it is obvious that it is meant otherwise.

The term "polyamic acid" as used herein is intended to include any polyimide precursor material derived from a combination of dianhydride and diamine and capable of conversion to a polyimide.

First Polyimide Layer

The first polyimide layer is derived from at least 50 mole percent of an aromatic dianhydride, based upon a total dianhydride content of the polyimide, and at least 50 mole percent of an aromatic diamine based upon a total diamine content of the polyimide. The term "dianhydride" as used herein is intended to include precursors, derivatives or analogs thereof, which may not technically be a dianhydride but would nevertheless react with a diamine to form a polyamic acid which could in turn be converted into a polyimide. The term "diamine" as used herein is intended to include precursors, derivatives or analogs thereof, which may not technically be a diamine but would nevertheless react with a dianhydride to form a polyamic acid which could in turn be converted into a polyimide.

In one embodiment, the aromatic dianhydride is selected from the group consisting of:
pyromellitic dianhydride;
3,3',4,4'-biphenyl tetracarboxylic dianhydride;
3,3',4,4'-benzophenone tetracarboxylic dianhydride;
4,4'-oxydiphthalic anhydride;
3,3',4,4'-diphenyl sulfone tetracarboxylic dianhydride;
2,2-bis(3,4-dicarboxyphenyl) hexafluoropropane;
Bisphenol A dianhydride; and
mixtures and derivatives thereof.
In another embodiment, the aromatic dianhydride is selected from the group consisting of:
2,3,6,7-naphthalene tetracarboxylic dianhydride;
1,2,5,6-naphthalene tetracarboxylic dianhydride;
2,2',3,3'-biphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;

oxydiphthalic dianhydride;
bis(3,4-dicarboxyphenyl) sulfone dianhydride;
mixtures and derivatives thereof.

In some embodiments, examples of suitable aliphatic dianhydrides include but are not limited to: cyclobutane dianhydride; [1S*,5R*,6S*]-3-oxabicyclo[3.2.1]octane-2,4-dione-6-spiro-3-(tetrahydrofuran-2,5-dione); and mixtures thereof.

In some embodiments, the aromatic diamine is selected from the group consisting of: 3,4'-oxydianiline; 1,3-bis-(4-aminophenoxy)benzene; 4,4'-oxydianiline; 1,4-diaminobenzene; 1,3-diaminobenzene; 2,2'-bis(trifluoromethyl)benzidine; 4,4'-diaminobiphenyl; 4,4'-diaminodiphenyl sulfide; 9,9'-bis(4-amino)fluorine; mixtures and derivatives thereof.

In another embodiment, the aromatic diamine is selected from a group consisting of: 4,4'-diaminodiphenyl propane; 4,4'-diamino diphenyl methane; benzidine; 3,3'-dichlorobenzidine; 3,3'-diamino diphenyl sulfone; 4,4'-diamino diphenyl sulfone; 1,5-diamino naphthalene; 4,4'-diamino diphenyl diethylsilane; 4,4'-diamino diphenysilane; 4,4'-diamino diphenyl ethyl phosphine oxide; 4,4'-diamino diphenyl N-methyl amine; 4,4'-diamino diphenyl N-phenyl amine; 1,4-diaminobenzene (p-phenylene diamine); 1,2-diaminobenzene; mixtures and derivatives thereof.

In some embodiments, examples of suitable aliphatic diamines include: hexamethylene diamine, dodecane diamine, cyclohexane diamine and mixtures thereof.

In one embodiment, the first polyimide layer comprises a polyimide derived from pyromellitic dianhydride and 4,4'-oxydianiline.

In some embodiments, the first polyimide layer is between and including any two of the following thicknesses: 8, 10, 20, 30, 40, 50, 60, 70, 80, 90, 100, 110, 120 and 130 microns thick. In another embodiment, the first polyimide layer is from 8 to 130 microns thick. In another embodiment, the first polyimide layer is from 10 to 30 microns thick. In another embodiment, the first polyimide layer is from 12 to 25 microns thick.

The first polyimide layer may optionally contain 1 to 15 wt % low conductivity carbon black. In some embodiments the first polyimide layer contains between and including any two of the following: 1, 5, 10 and 15 wt % low conductivity carbon black. In yet another embodiment, the first polyimide layer contains 2 to 9 wt % low conductivity carbon black.

Low conductivity carbon black is intended to mean, channel type black, furnace black or lamp black. In some embodiments, the low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polyamic acid solution (polyimide precursor), which in turn can be imidized into a (well dispersed) filled polyimide base polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content. Typically, a low conductivity carbon black has a pH less than 6.

A uniform dispersion of isolated, carbon black particles (aggregates) not only decreases the electrical conductivity, but additionally tends to produce uniform color intensity. In some embodiments the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 microns.

The first polyimide layer may optionally contain 1 to 40 wt % pigment or dye. In some embodiments the first polyimide layer contains 1 to 40 wt % of a mixture of pigments and dyes. In some embodiments, the first polyimide layer contains between and including any two of the following: 1, 5, 10, 15, 20, 25, 30, 35 and 40 wt % pigment, dye or mixtures thereof. In some embodiments, the first polyimide layer contains 1 to 40 wt % of a mixture of at least two of the following: low conductivity carbon black, pigments or dyes.

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, (Fe,Mn)2O3 black, copper chromite black spinel, lampblack, bone black, bone ash, bone char, hematite, black iron oxide, micaceous iron oxide, black complex inorganic color pigments (CICP), (Ni,Mn,Co)(Cr,Fe)2O4 black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Brown 35, Pigment Black 30, Pigment Black 32, Pigment Black 33 or mixtures thereof.

In some embodiments, the pigment is lithopone, zinc sulfide, barium sulfate, cobalt oxide, yellow iron oxide, orange iron oxide, red iron oxide, brown iron oxide, hematite, black iron oxide, micaceous iron oxide, chromium (III) green, ultramarine blue, ultramarine violet, ultramarine pink, cyanide iron blue, cadmium pigments or lead chromate pigments.

In some embodiments, the pigment is complex inorganic color pigments (CICP) such as spinel pigments, rutile pigments, zircon pigments or bismuth vanadate yellow. In some embodiments, useful spinel pigments include but are not limited to: Zn(Fe,Cr)2O4 brown, CoAl2O4 blue, Co(AlCr)2O4 blue-green, Co2TiO4 green, CuCr2O4 black or (Ni,Mn,Co)(Cr,Fe)2O4 black. In some embodiments, useful rutile pigments include but are not limited to: Ti—Ni—Sb yellow, Ti—Mn—Sb brown, Ti—Cr—Sb buff, zircon pigments or bismuth vanadate yellow.

In another embodiment, the pigment is an organic pigment. In some embodiments, useful organic pigments include but are not limited to: Aniline black (Pigment Black 1), Anthraquinone black, Monoazo type, Diazo type, Benzimidazolones, Diarylide yellow, Monoazo yellow salts, Dinitaniline orange, Pyrazolone orange, Azo red, Naphthol red, Azo condensation pigments, Lake pigments, Copper Phthalocyanine blue, Copper Phthalocyanine green, Quinacridones, Diaryl Pyrrolopyrroles, Aminoanthraquinone pigments, Dioxazines, Isoindolinones, Isoindolines, Quinophthalones, phthalocyanine pigments, idanthrone pigments, pigment violet 1, pigment violet 3, pigment violet 19 or pigment violet 23. In yet another embodiment, the organic pigment is a Vat dye pigment, such as but not limited to: perylene, perylene black, perinones or thioindigo.

A uniform dispersion of isolated, individual pigment particles (aggregates) tends to produce uniform color intensity. In some embodiments the pigment is milled. In some embodiments, the mean particle size of the pigment is between (and optionally including) any two of the following sizes: 0.2, 0.3, 0.4, 0.5, 0.6, 0.7, 0.8, 0.9 and 1.0 microns. In some embodiments, luminescent (fluorescent or phosphorescent), or pearlescent pigments can be used, alone, or in combination with other pigments or dyes.

In some embodiments, the first polyimide layer further comprises 1 to 20 wt % of a matting agent selected from silica, alumina, zirconia, boron nitride, barium sulfate, polyimide particles, calcium phosphate, talc or mixtures thereof. In another embodiment, the first polyimide layer further comprises 1 to 20 wt % of a matting agent that is a carbon black having a mean particle size from 2 to 9 micrometers. In yet another embodiment, the first polyimide layer further comprises 1 to 20 wt % of a matting agent, the matting agent being a mixture of
  i) carbon black having a mean particle size from 2 to 9 microns; and
  ii) silica, alumina, zirconia, boron nitride, barium sulfate, polyimide particles, calcium phosphate, talc or mixtures thereof.

In some embodiments, the first polyimide layer comprises:
  i) a chemically converted polyimide in an amount from 71 to 96 wt %, the chemically converted polyimide being derived from:
    a. at least 50 mole percent of an aromatic dianhydride, based upon a total dianhydride content of the polyimide, and
    b. at least 50 mole percent of an aromatic diamine, based upon a total diamine content of the polyimide;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc.

In a chemical conversion process, the polyamic acid solution is either immersed in or mixed with conversion (imidization) chemicals. In one embodiment, the conversion chemicals are tertiary amine catalysts (accelerators) and anhydride dehydrating materials. In one embodiment, the anhydride dehydrating material is acetic anhydride, which is often used in molar excess relative to the amount of amic acid (amide acid) groups in the polyamic acid, typically about 1.2 to 2.4 moles per equivalent of polyamic acid. In one embodiment, a comparable amount of tertiary amine catalyst is used.

Alternatives to acetic anhydride as the anhydride dehydrating material include: i. other aliphatic anhydrides, such as, propionic, butyric, valeric, and mixtures thereof; ii. anhydrides of aromatic monocarboxylic acids; iii. Mixtures of aliphatic and aromatic anhydrides; iv. carbodimides; and v. aliphatic ketenes (ketenes may be regarded as anhydrides of carboxylic acids derived from drastic dehydration of the acids).

In one embodiment, the tertiary amine catalysts are pyridine and beta-picoline and are typically used in amounts similar to the moles of anhydride dehydrating material. Lower or higher amounts may be used depending on the desired conversion rate and the catalyst used. Tertiary amines having approximately the same activity as the pyridine, and beta-picoline may also be used. These include alpha picoline; 3,4-lutidine; 3,5-lutidine; 4-methyl pyridine; 4-isopropyl pyridine; N,N-dimethylbenzyl amine; isoquinoline; 4-benzyl pyridine, N,N-dimethyldodecyl amine, triethyl amine, and the like. A variety of other catalysts for imidization are known in the art, such as imidazoles, and may be useful in accordance with the present disclosure.

The conversion chemicals can generally react at about room temperature or above to convert polyamic acid to polyimide. In one embodiment, the chemical conversion reaction occurs at temperatures from 15° C. to 120° C. with the reaction being very rapid at the higher temperatures and relatively slower at the lower temperatures.

In one embodiment, the chemically treated polyamic acid solution can be cast or extruded onto a heated conversion surface or substrate. In one embodiment, the chemically treated polyamic acid solution can be cast on to a belt or drum. The solvent can be evaporated from the solution, and the polyamic acid can be partially chemically converted to polyimide. The resulting solution then takes the form of a polyamic acid-polyimide gel. Alternately, the polyamic acid solution can be extruded into a bath of conversion chemicals consisting of an anhydride component (dehydrating agent), a tertiary amine component (catalyst) or both with or without a diluting solvent. In either case, a gel film is formed and the percent conversion of amic acid groups to imide groups in the gel film depends on contact time and temperature but is usually about 10 to 75 percent complete. For curing to a solids level greater than 98%, the gel film typically must be dried at elevated temperature (from about 200° C., up to about 550° C.), which will tend to drive the imidization to completion. In some embodiments, the use of both a dehydrating agent and a catalyst is preferred for facilitating the formation of a gel film and achieve desired conversion rates.

Second Polyimide Layer

The second polyimide layer comprises 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide. In some embodiments, the second polyimide layer comprises between and including any two of the following: 25, 30, 35, 40, 45 and 50 wt % of a polyimide. In another embodiment, the second polyimide layer comprises 27 to 50 wt % of a polyimide.

In one embodiment, the aromatic dianhydride is selected from the group consisting of:
pyromellitic dianhydride;
3,3',4,4'-biphenyl tetracarboxylic dianhydride;
3,3',4,4'-benzophenone tetracarboxylic dianhydride;
4,4'-oxydiphthalic anhydride;
3,3',4,4'-diphenyl sulfone tetracarboxylic dianhydride;
2,2-bis(3,4-dicarboxyphenyl) hexafluoropropane;
Bisphenol A dianhydride; and
  mixtures and derivatives thereof.
In another embodiment, the aromatic dianhydride is selected from the group consisting of:
2,3,6,7-naphthalene tetracarboxylic dianhydride;
1,2,5,6-naphthalene tetracarboxylic dianhydride;
2,2',3,3'-biphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
1,1-bis(2,3-dicarboxyphenyl) ethane dianhydride;
1,1-bis(3,4-dicarboxyphenyl) ethane dianhydride;

bis(2,3-dicarboxyphenyl) methane dianhydride; bis(3,4-dicarboxyphenyl) methane dianhydride; oxydiphthalic dianhydride; bis(3,4-dicarboxyphenyl) sulfone dianhydride; mixtures and derivatives thereof.

In some embodiments, examples of suitable aliphatic dianhydrides include but are not limited to: cyclobutane dianhydride; [1S*,5R*,6S*]-3-oxabicyclo[3.2.1]octane-2,4-dione-6-spiro-3-(tetrahydrofuran-2,5-dione); and mixtures thereof.

In some embodiments, the aromatic diamine is selected from the group consisting of: 3,4'-oxydianiline; 1,3-bis-(4-aminophenoxy)benzene; 4,4'-oxydianiline; 1,4-diaminobenzene; 1,3-diaminobenzene; 2,2'-bis(trifluoromethyl)benzidene; 4,4'-diaminobiphenyl; 4,4'-diaminodiphenyl sulfide; 9,9'-bis(4-amino)fluorine; mixtures and derivatives thereof.

In another embodiment, the aromatic diamine is selected from a group consisting of: 4,4'-diaminodiphenyl propane; 4,4'-diamino diphenyl methane; benzidine; 3,3'-dichlorobenzidine; 3,3'-diamino diphenyl sulfone; 4,4'-diamino diphenyl sulfone; 1,5-diamino naphthalene; 4,4'-diamino diphenyl diethylsilane; 4,4'-diamino diphenysilane; 4,4'-diamino diphenyl ethyl phosphine oxide; 4,4'-diamino diphenyl N-methyl amine; 4,4'-diamino diphenyl N-phenyl amine; 1,4-diaminobenzene (p-phenylene diamine); 1,2-diaminobenzene; mixtures and derivatives thereof.

In some embodiments, examples of suitable aliphatic diamines include: hexamethylene diamine, dodecane diamine, cyclohexane diamine and mixtures thereof.

In one embodiment, the second polyimide layer comprises a polyimide derived from pyromellitic dianhydride and 4,4'-oxydianiline or derived from pyromellitic dianhydride, 4,4'-oxydianiline and paraphenylenediamine. In another embodiment, the second polyimide layer comprises a polyimide derived from 3,3',4,4'-biphenyl tetracarboxylic dianhydride, pyromellitic dianhydride, 4,4'-oxydianiline and paraphenylenediamine. In another embodiment, the second polyimide layer comprises a polyimide derived from i) blocks of pyromellitic dianhydride and 4,4'-oxydianiline and ii) blocks of pyromellitic dianhydride and paraphenylenediamine. In yet another embodiment, the second polyimide layer comprises a polyimide derived from 3,3',4,4'-biphenyl tetracarboxylic dianhydride, pyromellitic dianhydride, 4,4'-oxydianiline and paraphenylenediamine. In yet another embodiment, the first polyimide layer comprises a polyimide derived from pyromellitic dianhydride and 4,4'-oxydianiline, and the second polyimide layer comprises a polyimide derived from
  i) pyromellitic dianhydride and 4,4'-oxydianiline, or derived from
  ii) pyromellitic dianhydride, 4,4'-oxydianiline and paraphenylenediamine, or derived from
  iii) blocks of pyromellitic dianhydride and 4,4'-oxydianiline and blocks of pyromellitic dianhydride and paraphenylenediamine, or derived from
  iv) 3,3',4,4'-biphenyl tetracarboxylic dianhydride, pyromellitic dianhydride, 4,4'-oxydianiline and paraphenylenediamine.

In some embodiments, the second polyimide layer is thinner than the first polyimide layer. Typically the second polyimide layer is highly filled, and the first polyimide layer must provide mechanical support. Thus it is desirable to have a thin second polyimide layer. In some embodiments, the second polyimide layer is from 0.5 to 20 microns thick. In some embodiments, the second polyimide layer is between and including any two of the following thicknesses: 0.5, 1, 5, 10, 15, and 20 microns thick. In yet another embodiment, the second layer is from 1 to 10 microns thick. In some embodiments, the second layer is from 1 to 9 microns thick.

The second layer is in direct contact with the first polyimide layer. The term "direct contact" is intended to mean two surfaces adjacent to each other without an intervening material or adhesive layer between the two surfaces.

The second polyimide layer comprises greater than 0 wt % and less than 20 wt % of a silica matting agent. In some embodiments, the second polyimide layer comprises greater than 0 and less than 20 wt % of a silica matting agent or a mixture of silica matting agent with at least one additional matting agent. In some embodiments, the silica matting agent is mixed with one or more additional matting agents selected from alumina, zirconia, boron nitride, barium sulfate, polyimide particles, calcium phosphate, talc or mixtures thereof. In another embodiment, the second polyimide layer comprises greater than 5 wt % and less than 18 wt % of a silica matting agent. In yet another embodiment, the second polyimide layer comprises from 6 to 17 wt % of silica matting agent.

The second polyimide layer comprises greater than 0 and less than 20 wt % of at least one submicron carbon black. The term "submicron" is intended to mean less than one micron in all dimensions. In another embodiment, the second polyimide layer comprises greater than 2 and less than 17 wt % of at least one submicron carbon black. In another embodiment, the second polyimide layer comprises 3 to 16 wt % of at least one submicron carbon black. The submicron carbon black for the purpose of the present disclosure, is intended to be the colorant. One of ordinary skill in the art could also envision the use of other colorants (pigments or dyes) to create any desired color. In some embodiments, the same pigment or dye used in the second polyimide layer may be used in the first polyimide layer. In yet another embodiment, the colorant in the second polyimide layer could be different from any colorant that may be used in the first polyimide layer.

The second polyimide layer comprises 15 to 50 wt % of at least one submicron fumed metal oxide (also known as pyrogenic metal oxide). In some embodiments, the submicron fumed metal oxide is fumed alumina, fumed silica or mixtures thereof. In some embodiments, the second polyimide layer comprises 17 to 46 wt % of at least one submicron fumed metal oxide. The addition of a submicron fumed metal oxide surprisingly lowers the amount of colorant (such as submicron carbon black) needed in the second polyimide layer to produce a multilayer film with an L* color less than 30. The submicron fumed alumina and fumed silica, by themselves, in PI film, are white-ish or hazy so it was unpredictable that their addition would actually lower the amount of colorant needed to produce deep, rich saturated colors. It is also surprising that other submicron metal oxides do not have the same the same effect.

The particle size of the fumed alumina, fumed silica, submicron carbon black, silica matting agent or low conductivity carbon black can be measured in the slurries by laser diffraction using either a Horiba LA-930 (Horiba, Instruments, Inc., Irvine Calif.) or a Malvern Mastersizer 3000 (Malvern Instruments, Inc., Westborough, Mass.).

Multilayer Film

The multilayer film in accordance with the present disclosure has a first polyimide layer and a second polyimide layer as described above. The multilayer film has an L* color less than 30 and a 60 degree gloss value less than 10 as well as durability to handling and circuit processing. The L* color is measured using a HunterLab ColorQuest® XE color meter (Hunter Associates Laboratory, Inc.) in the reflectance, specular included mode and reported in the CIELAB 10°/D65 system, as L*, a*, b*. A L* value of 0 is pure black, while a L* value of 100 is pure white. The 60 degree gloss was measured using a Micro-TRI-gloss glossmeter (from BYK-Gardner).

FIG. 1 illustrates one embodiment of the present disclosure, a multilayer film comprising an adhesive layer 60 in direct contact with the first polyimide layer 10 opposite the second polyimide layer 20, wherein the second polyimide layer comprises a silica matting agent 30, a submicron carbon black 40 and a submicron fumed metal oxide 50. In some embodiments, the adhesive layer is an epoxy adhesive selected from the group consisting of: Bisphenol A type epoxy resin, cresol novolac type epoxy resin, phosphorus containing epoxy resin, and mixtures thereof. Typically, an adhesive layer is as thick as or thicker than the first polyimide layer or the second polyimide layer. In some embodiments the adhesive layer is from 8 to 300 microns thick.

In some embodiments, the adhesive is a mixture of two or more epoxy resins. In some embodiments, the adhesive is a mixture of the same epoxy resin having different molecular weights.

In some embodiments, the epoxy adhesive contains a hardener. In some embodiments, the epoxy adhesive contains a catalyst. In some embodiments, the epoxy adhesive contains an elastomer toughening agent. In some embodiments, the epoxy adhesive contains a flame retardant.

In some embodiments, the multilayer film further comprises a third polyimide layer. In some embodiments, the third polyimide layer is from 0.5 to 20 microns thick. In another embodiment, the third polyimide layer is between and including any two of the following thicknesses: 0.5, 1, 5, 10, 15 and 20 micron thick. In some embodiments, the third polyimide layer is from 0.5 to 15 microns thick. In some embodiments, the third polyimide layer is from 0.5 to 8 microns thick. In some embodiments, the multilayer film further comprises a third polyimide layer from 0.5 to 20 microns thick in direct contact with the first polyimide layer opposite the second polyimide layer.

A third polyimide layer, is particularly desired when the multilayer film is coextruded. The third polyimide layer, when similar to or the same as the second polyimide layer, helps prevent curl. The third polyimide layer may be the same as, or different from, the second polyimide layer.

In some embodiments, the multilayer film further comprises a third polyimide layer from 0.5 to 20 microns thick in direct contact with the first polyimide layer opposite the second polyimide layer, the third polyimide layer comprising:
  i) a polyimide derived from at least 50 mole percent of an aromatic dianhydride, based upon a total dianhydride content of the polyimide, and at least 50 mole percent of an aromatic diamine based upon a total diamine content of the polyimide; and
  ii) a matting agent or mixture thereof.

In one embodiment, the matting agent in the third polyimide layer is selected from silica, alumina, zirconia, boron nitride, barium sulfate, polyimide particles, calcium phosphate, talc or mixtures thereof. In another embodiment, the matting agent in the third polyimide layer is a carbon black having a mean particle size from 2 to 9 microns. In yet another embodiment, the matting agent in the third polyimide layer is a mixture of
  i) carbon black having a mean particle size from 2 to 9 microns; and ii) silica, alumina, zirconia, boron nitride, barium sulfate, polyimide particles, calcium phosphate, talc or mixtures thereof.

In one embodiment, the third polyimide layer comprises a polyimide derived from pyromellitic dianhydride and 4,4'-oxydianiline. In another embodiment, the third polyimide layer comprises a polyimide derived from pyromellitic dianhydride, 4,4'-oxydianiline and paraphenylenediamine. In another embodiment, the second polyimide layer comprises a polyimide derived from 3,3',4,4'-biphenyl tetracarboxylic dianhydride, pyromellitic dianhydride, 4,4'-oxydianiline and paraphenylenediamine. In another embodiment, the third polyimide layer comprises a polyimide derived from i) blocks of pyromellitic dianhydride and 4,4'-oxydianiline and ii) blocks of pyromellitic dianhydride and paraphenylenediamine.

In another embodiment, the multilayer film further comprises a third polyimide layer from 0.5 to 20 microns thick in direct contact with the first polyimide layer opposite the second polyimide layer; the third polyimide layer comprises:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent with at least one additional matting agent;
  iii) greater than 0 and less than 20 wt % of at least one submicron carbon black; and
  iv) 15 to 50 wt % of at least one submicron fumed metal oxide.

Figure 2:
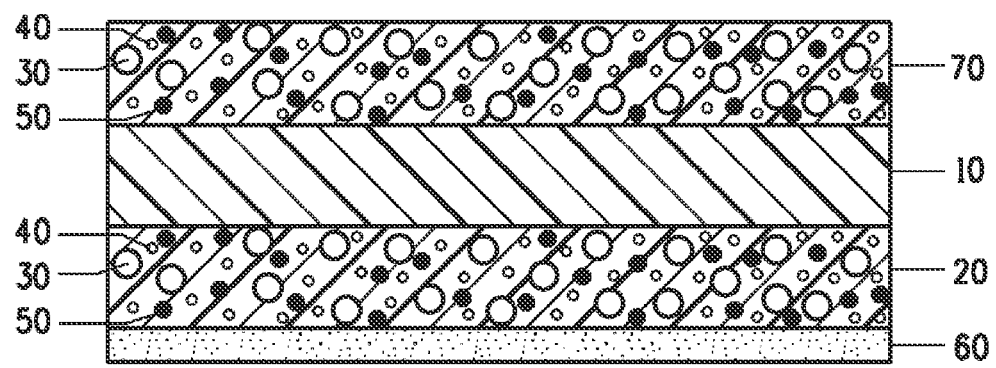
FIG. 2 illustrates a third polyimide layer, an adhesive layer in direct contact with the second polyimide layer on a surface of the second polyimide layer furthest from the first polyimide layer according to one embodiment of the present disclosure.

FIG. 2 illustrates another embodiment of the present disclosure, a multilayer film comprising a third polyimide layer 70 in direct contact with the first polyimide layer, an adhesive layer 60 in direct contact with the second polyimide layer 20 on a surface of the second polyimide layer furthest from the first polyimide layer 10, wherein the second polyimide layer comprises a silica matting agent 30, a submicron carbon black 40 and a submicron fumed metal oxide 50. In yet another embodiment, an adhesive layer 60 may be in direct contact with the third polyimide layer 70 on a surface of the third polyimide furthest from the first polyimide layer 10.

In one embodiment, the multilayer film comprises:
  a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
  b. a second polyimide layer from 0.5 to microns thick in direct contact with the first polyimide layer, the second polyimide layer comprising:
    i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
    ii) greater than 0 and less than 20 wt % of a silica matting agent or a mixture of silica matting agent and at least one additional matting agent;
    iii) greater than 0 and less than 20 wt % of at least one submicron carbon black;
    iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
c. an adhesive layer in direct contact with the first polyimide layer opposite the second polyimide layer; wherein the adhesive layer is an epoxy resin selected from the group consisting of: Bisphenol A type epoxy resin, cresol novolac type epoxy resin, phosphorus containing epoxy resin, and mixtures thereof; and
wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent and at least one additional matting agent;
  iii) greater than 0 and less than 20 wt % of at least one submicron carbon black; and
  iv) 15 to 50 wt % of at least one submicron fumed metal oxide.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
d. an adhesive layer in direct contact an adhesive layer in direct contact with the second polyimide layer on a surface of the second polyimide layer opposite from the first polyimide layer; wherein the adhesive layer is an epoxy resin selected from the group consisting of: Bisphenol A type epoxy resin, cresol novolac type epoxy resin, phosphorus containing epoxy resin, and mixtures thereof; and
wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to 20 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;

ii) greater than 0 and less than 20 wt % of a silica matting agent or a mixture of silica matting agent and at least one additional matting agent;
iii) greater than 0 and less than 20 wt % of at least one submicron carbon black;
iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
ii) greater than 0 and less than 20 wt % of a silica matting agent or a mixture of silica matting agent and at least one additional matting agent;
iii) greater than 0 and less than 20 wt % of at least one submicron carbon black;
iv) 15 to 50 wt % of at least one submicron fumed metal oxide; and
d. an adhesive layer in direct contact an adhesive layer in direct contact with the third polyimide layer on a surface of the third polyimide layer opposite from the first polyimide layer; wherein the adhesive layer is an epoxy resin selected from the group consisting of: Bisphenol A type epoxy resin, cresol novolac type epoxy resin, phosphorus containing epoxy resin, and mixtures thereof; and wherein the multilayer film has an L* color less than 30 and a 60 degree gloss value less than 10.

In one embodiment, the multilayer film comprises:
a. a first polyimide layer from 8 to 130 microns thick comprising:
i) a polyimide derived from at least 50 mole percent of an aromatic dianhydride, based upon a total dianhydride content of the polyimide, and at least 50 mole percent of an aromatic diamine based upon a total diamine content of the polyimide;
ii) 1 to 15 wt % low conductivity carbon black, or 1 to 40 wt % pigment or dye;
b. a second polyimide layer from 0.5 to 20 microns thick in direct contact with the first polyimide layer, the second polyimide layer comprising:
i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
ii) greater than 0 and less than 20 wt % of a silica matting agent or a mixture of silica matting agent and at least one additional matting agent;
iii) greater than 0 and less than 20 wt % of at least one submicron carbon black;
iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer from 8 to 130 microns thick comprising: i) a polyimide derived from: at least 50 mole percent of an aromatic dianhydride, based upon a total dianhydride content of the polyimide, and at least 50 mole percent of an aromatic diamine based upon a total diamine content of the polyimide;
ii) 1 to 15 wt % low conductivity carbon black, or 1 to 40 wt % pigment or dye;
iii) 1 to 20 wt % of a matting agent selected from silica, alumina, zirconia, boron nitride, barium sulfate, polyimide particles, calcium phosphate, talc or mixtures thereof;
b. a second polyimide layer from 0.5 to 20 microns thick in direct contact with the first polyimide layer, the second polyimide layer comprising:
i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
ii) greater than 0 and less than 20 wt % of a silica matting agent or a mixture of silica matting agent and at least one additional matting agent;
iii) greater than 0 and less than 20 wt % of at least one submicron carbon black;
iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer comprising:
i) a chemically converted polyimide in an amount from 71 to 96 weight percent, the chemically converted polyimide being derived from: at least 50 mole percent of an aromatic dianhydride, based upon a total dianhydride content of the polyimide, and at least 50 mole percent of an aromatic diamine based upon a total diamine content of the polyimide;
ii) a low conductivity carbon black present in an amount from 2 to 9 wt %; and
iii) a matting agent that:
 a. is present in an amount from 1.6 to 10 wt %,
 b. has a median particle size from 1.3 to 10 microns, and
 c. has a density from 2 to 4.5 g/cc;
b. a second polyimide layer from 0.5 to 20 microns thick in direct contact with the first polyimide layer, the second polyimide layer comprising:
i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
ii) greater than 0 and less than 20 wt % of a silica matting agent or a mixture of silica matting agent and at least one additional matting agent;
iii) greater than 0 and less than 20 wt % of at least one submicron carbon black;
iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer comprising:
i) a chemically converted polyimide in an amount from 71 to 96 weight percent, the chemically converted polyimide being derived from: at least 50 mole percent of an aromatic dianhydride, based upon a total dianhydride content of the polyimide, and at least 50 mole percent of an aromatic diamine based upon a total diamine content of the polyimide;

ii) a low conductivity carbon black present in an amount from 2 to 9 wt %; and
iii) a matting agent that:
  a. is present in an amount from 1.6 to 10 wt %,
  b. has a median particle size from 1.3 to 10 microns, and
  c. has a density from 2 to 4.5 g/cc;
b. a second polyimide layer from 0.5 to 25 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
  i) a polyimide derived from at least 50 mole percent of an aromatic dianhydride, based upon a total dianhydride content of the polyimide, and at least 50 mole percent of an aromatic diamine based upon a total diamine content of the polyimide;
  ii) a matting agent or mixture thereof; and
wherein the multilayer film has an L* color less than 30 and a 60 degree gloss value less than 10.

In one embodiment, the multilayer film comprises:
a. a first polyimide layer comprising:
  i) a chemically converted polyimide in an amount from 71 to 96 weight percent, the chemically converted polyimide being derived from: at least 50 mole percent of an aromatic dianhydride, based upon a total dianhydride content of the polyimide, and at least 50 mole percent of an aromatic diamine based upon a total diamine content of the polyimide;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc;
b. a second polyimide layer from 0.5 to 25 microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
c. a third polyimide layer from 0.5 to 20 microns thick in direct contact with the first polyimide layer opposite the second polyimide layer, the third polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and
wherein the multilayer film has an L* color less than 30 and a 60 degree gloss value less than 10.

In one embodiment, the multilayer film comprises:
a. a first polyimide layer from 8 to 130 microns thick comprising: a polyimide derived from pyromellitic dianhydride and 4,4'-oxydianiline;
b. a second polyimide layer from 0.5 to microns thick in direct contact with the first polyimide layer, the second polyimide layer comprising:
  i) 25 to 50 wt % of a polyimide derived from
    a) pyromellitic dianhydride and 4,4'-oxydianiline,
    b) pyromellitic dianhydride, 4,4'-oxydianiline and paraphenylenediamine,
    c) blocks of pyromellitic dianhydride and 4,4'-oxydianiline and blocks of pyromellitic dianhydride and paraphenylenediamine, or
    d) 3,3',4,4'-biphenyl tetracarboxylic dianhydride, pyromellitic dianhydride, 4,4'-oxydianiline and paraphenylenediamine;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide;
and wherein the multilayer film has an L* color less than 30 and a 60 degree gloss value less than 10.

In one embodiment, the multilayer film comprises:
a. a first polyimide layer comprising:
  i) a chemically converted polyimide in an amount from 71 to 96 weight percent, the chemically converted polyimide being derived from pyromellitic dianhydride and 4,4'-oxydianiline;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc;
b. a second polyimide layer from 0.5 to 25 microns thick in direct contact with the first polyimide layer, the second polyimide layer comprising:
  i) 25 to 50 wt % of a polyimide derived from
    a) pyromellitic dianhydride and 4,4'-oxydianiline,
    b) pyromellitic dianhydride, 4,4'-oxydianiline and paraphenylenediamine,
    c) blocks of pyromellitic dianhydride and 4,4'-oxydianiline and blocks of pyromellitic dianhydride and paraphenylenediamine, or d) 3,3',4,4'-biphenyl tetracarboxylic dianhydride, pyromellitic dianhydride, 4,4'-oxydianiline and paraphenylenediamine;
ii) greater than 0 and less than 20 wt % of a silica matting agent or a mixture of silica matting agent and at least one additional matting agent;
v) greater than 0 and less than 20 wt % of at least one submicron carbon black;
vi) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer comprising:
  i) a chemically converted polyimide in an amount from 71 to 96 weight percent, the chemically converted polyimide being derived from pyromellitic dianhydride and 4,4'-oxydianiline;
  ii) a low conductivity carbon black present in an amount from 2 to 9 wt %; and
  iii) a matting agent that:
    a. is present in an amount from 1.6 to 10 wt %,
    b. has a median particle size from 1.3 to 10 microns, and
    c. has a density from 2 to 4.5 g/cc;
b. a second polyimide layer from 0.5 to 25 microns thick in direct contact with the first polyimide layer, the second polyimide layer comprising:
  i) 25 to 50 wt % of a polyimide derived from
    a) pyromellitic dianhydride and 4,4'-oxydianiline,
    b) pyromellitic dianhydride, 4,4'-oxydianiline and paraphenylenediamine,
    c) blocks of pyromellitic dianhydride and 4,4'-oxydianiline and blocks of pyromellitic dianhydride and paraphenylenediamine, or
    d) 3,3',4,4'-biphenyl tetracarboxylic dianhydride, pyromellitic dianhydride, 4,4'-oxydianiline and paraphenylenediamine;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and wherein the multilayer film has an L* color less than 30 and a 60 degree gloss value less than 10.
c. a third polyimide layer from 0.5 to 20 microns thick in direct contact with the first polyimide layer opposite the second polyimide layer, the third polyimide layer comprising:
  i) 25 to 50 wt % of a polyimide derived from
    a) pyromellitic dianhydride and 4,4'-oxydianiline,
    b) pyromellitic dianhydride, 4,4'-oxydianiline and paraphenylenediamine,
    c) blocks of pyromellitic dianhydride and 4,4'-oxydianiline and blocks of pyromellitic dianhydride and paraphenylenediamine, or
    d) 3,3',4,4'-biphenyl tetracarboxylic dianhydride, pyromellitic dianhydride, 4,4'-oxydianiline and paraphenylenediamine;
  ii) greater than 0 and less than 20 wt % of a silica matting agent or a mixture of silica matting agent and at least one additional matting agent;
  iii) greater than 0 and less than 20 wt % of at least one submicron carbon black;
  iv) 15 to 50 wt % of at least one submicron fumed metal oxide; and wherein the multilayer film has an L* color less than 30 and a 60 degree gloss value less than 10.

In one embodiment, the multilayer film comprises:
a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
b. a second polyimide layer from 0.5 to microns thick in direct contact with the first polyimide layer, the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
  ii) greater than 5 and less than 18 wt % of a silica matting agent or a mixture of silica matting agent and at least one additional matting agent;
  iii) greater than 2 and less than 17 wt % of at least one submicron carbon black;
  iv) 17 to 46 wt % of at least one submicron fumed metal oxide; and wherein the multilayer film has an L* color less than 30 and a 60 degree gloss value less than 10.

Another embodiment of the present disclosure is a method of producing a multilayer film having an L* color less than 30 and a 60 degree gloss value less than 10; the method comprising:
a. providing a first polyimide layer from 8 to 130 microns thick;
b. coating a second polyimide layer from 0.5 to 8 microns thick on to the first polyimide layer; the second polyimide layer comprising:
  i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide
  ii) greater than 0 and less than 20 wt % of a silica matting agent or a mixture of silica matting agent and at least one additional matting agent;
  iii) greater than 0 and less than 20 wt % of at least one submicron carbon black; and
  iv) 15 to 50 wt % of at least one submicron fumed metal oxide.

The first polyimide layer and the second polyimide layer of the present disclosure can be made by any well-known method in the art for making filled polyimide films. In some embodiments, the first polyimide layer and the second polyimide layer are made by a thermal conversion process (thermally imidized) in which the polyamic acid solution is heated to temperatures typically greater than 250° C. to convert the polyamic acid to a polyimide. In another embodiment, the first polyimide layer and the second polyimide layer are made by a chemical conversion process (chemically imidized). In one embodiment, one such method includes preparing a pigment slurry. The slurry may or may not be milled using a ball mill or continuous media mill to reach the desired particle size. The slurry may or may not be filtered to remove any residual large particles. A polyamic acid prepolymer solution is prepared by reacting dianhydride with a slight excess of diamine. The polyamic acid solution is mixed in a high shear mixer with the pigment slurry. The amount of the polyamic acid solution, pigment slurry, and finishing solution can be adjusted to achieve the desired loading levels of pigment and the desired viscosity for film formation. "Finishing solution" herein denotes a dianyhdride in a polar aprotic solvent which is added to a prepolymer solution to increase the molecular weight and viscosity. The dianhydride used is typically the same dianhydride used (or one of the same dianhydrides when more than one is used) to make the prepolymer. The mixture can be metered through a slot die and cast or manually cast onto a smooth stainless steel belt or substrate to produce a gel film. Conversion chemicals can be metered in before casting using a slot die. For conversion to greater than 98 percent solids level, the gel film typically must be dried at elevated temperature (convective heating from 200-300° C. and radiant heating from 400-800° C.), which will tend to drive the imidization to completion. In yet another embodiment, the first polyimide layer and the second polyimide layer are independently made by either a thermal conversion process or a chemical conversion process.

The multilayer film of the present disclosure can be prepared by any well-known method such as but not limited to coextrusion, lamination (laminating single layers together), coating and combinations thereof. A description of a coextrusion process for preparing multilayer polyimide films is provided in EP 0659553 A1 to Sutton et al. Coating methods include, but are not limited to, spray coating, curtain coating, knife over roll, air knife, extrusion/slot die, gravure, reverse gravure, offset gravure, roll coating, and dip/immersion.

In some embodiments, the multilayer film is prepared by simultaneously extruding (coextruding) the first polyimide layer and the second polyimide layer. In some embodiments, the multilayer film is prepared by simultaneously extruding (coextruding) the first polyimide layer, the second polyimide layer and the third polyimide layer. In some embodiments, the layers are extruded through a single or multi-cavity extrusion die. In another embodiment, the multilayer film is produced using a single-cavity die. If a single-cavity die is used, the laminar flow of the streams should be of high enough viscosity to prevent comingling of the streams and to provide even layering. In some embodiments, the multilayer film is prepared by casting from the slot die onto a moving stainless steel belt. In one embodiment, the belt is then passed through a convective oven, to evaporate solvent and partially imidize the polymer, to produce a "green" film. The green film can be stripped off the casting belt and wound up. The green film can then be passed through a tenter oven to produce a fully cured polyimide film. In some embodiments, during tentering, shrinkage can be minimized by constraining the film along the edges (i.e. using clips or pins).

In some embodiments, the multilayer film is made by coating a solution of silica matting agent, submicron carbon black and submicron fumed metal oxide slurries and polyamic acid on the first polyimide layer. The coating is heated to dry. The resulting multilayer film is placed on a pin frame to hold it flat. The coating can be cured in a batch or continuous oven capable of heating to at least 250° C. The oven temperature is ramped to 320° C. over a period of 45 to 60 minutes, then transferred to a 400° C. oven and held for 5 minutes. In some embodiments, chemical imidization catalysts and/or dehydrating agents can be added to the coating solution.

Another embodiment of the present disclosure is, a method of reducing the amount of colorant in a multilayer film and achieving an L* color less than 30 and a 60 degree gloss value less than 10, the method comprising;

a) providing a first polyimide layer or a first polyamic acid solution or a first polyamic acid green film;
b) providing a second polyamic acid solution containing polyamic acid, silica matting agent, and submicron carbon black;
c) adding at least one submicron fumed metal oxide to the second polyamic acid solution;
d) coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
f) imidizing the coating formed in step d to form a second polyimide layer on the first polyimide layer, or imidizing the coating formed in step d and the first polyamic acid green film to form a first polyimide layer and a second polyimide layer, or imidizing the coextruded layers formed in step d to form a first polyimide layer and a second polyimide layer.

In yet another embodiment of the present disclosure is, a method of reducing the amount of colorant in a multilayer film and achieving an L* color less than 30 and a 60 degree gloss value less than 10, the method comprising;

a) providing a first polyimide layer or a first polyamic acid solution or a first polyamic acid green film derived from pyromellitic dianhydride and 4,4'-oxydianiline;
b) providing a second polyamic acid solution containing polyamic acid, silica matting agent, and submicron carbon black; wherein the polyamic acid is derived from pyromellitic dianhydride and 4,4'-oxydianiline, or derived from pyromellitic dianhydride, 4,4'-oxydianiline and paraphenylenediamine, or derived from 3,3', 4,4'-biphenyl tetracarboxylic dianhydride, pyromellitic dianhydride, 4,4'-oxydianiline and paraphenylenediamine, or derived from i) blocks of pyromellitic dianhydride and 4,4'-oxydianiline and ii) blocks of pyromellitic dianhydride and paraphenylenediamine;
c) adding 15 to 50 wt % of at least one submicron fumed metal oxide to the second polyamic acid solution;
d) coating the polyamic acid solution formed in step c on to the first polyimide layer or, coating the polyamic acid solution formed in step c on to the first polyamic acid green film; or coextruding the polyamic acid solution formed in step c and the first polyamic acid solution; and
f) imidizing the coating formed in step d to form a second polyimide layer on the first polyimide layer, or imidizing the coating formed in step d and the first polyamic acid green film to form a first polyimide layer and a second polyimide layer, or imidizing the coextruded layers formed in step d to form a first polyimide layer and a second polyimide layer; and
wherein the second polyimide layer is in direct contact with the first polyimide layer.

Another embodiment of the present disclosure is a method of reducing the amount of colorant in a multilayer film and achieving an L* color less than 30 and a 60 degree gloss value less than 10, the method comprising:

a) providing a component selected from the group consisting of: a first polyimide layer, a first polyamic acid solution and a first polyamic acid green film;
b) providing a second polyamic acid solution containing polyamic acid, silica matting agent, and submicron carbon black;
c) adding at least one submicron fumed metal oxide to the second polyamic acid solution;

d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and f) imidizing the composite formed in step d to produce a first polyimide layer and a second polyimide layer.

The submicron fumed metal oxide or mixtures thereof can be added directly to the second polyamic acid solution or by preparing a submicron fumed metal oxide slurry which is then added to the second polyamic acid solution. In some embodiments, the second polyamic acid solution is added to the submicron fumed metal oxide slurry. In some embodiments, the silica matting agent, the submicron carbon black and the submicron fumed metal oxide (and slurries thereof) may be combined in any order before coating the polyamic acid solution formed in step c on to the first polyimide layer; or coextruding the polyamic acid solution formed in step c and the first polyamic acid solution.

The polyamic acid formed in step c can be coated by methods well known in the art such as, but not limited to, spray coating, curtain coating, knife over roll, air knife, extrusion/slot die, gravure, reverse gravure, offset gravure, roll coating, and dip/immersion.

The coating or coextruded layers can be imidized by thermal conversion or chemical conversion as previously described.

In some embodiments, the first polyamic acid solution is partially dried and partly imidized to form a first polyamic acid green film. Then the polyamic acid solution formed in step c is coated on the first polyamic acid green film and both layers are imidized.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film;
  b) providing a second polyamic acid solution containing polyamic acid, silica matting agent, and submicron carbon black;
  c) adding at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer; and wherein the second polyimide layer is in direct contact with the first polyimide layer.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film and derived from pyromellitic dianhydride and 4,4'-oxydianiline,
  b) providing a second polyamic acid solution containing polyamic acid, silica matting agent, and submicron carbon black;
  c) adding at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer.

In yet another embodiment, the method of reducing amount of colorant in a multilayer film wherein the second polyimide layer comprises a polyimide derived from pyromellitic dianhydride and 4,4'-oxydianiline or derived from pyromellitic dianhydride, 4,4'-oxydianiline and paraphenylenediamine or derived from 3,3',4,4'-biphenyl tetracarboxylic dianhydride, pyromellitic dianhydride, 4,4'-oxydianiline and paraphenylenediamine or derived from i) blocks of pyromellitic dianhydride and 4,4'-oxydianiline and ii) blocks of pyromellitic dianhydride and paraphenylenediamine.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film and derived from pyromellitic dianhydride and 4,4'-oxydianiline,
  b) providing a second polyamic acid solution containing polyamic acid, silica matting agent, and submicron carbon black; wherein the polyamic acid is derived from pyromellitic dianhydride and 4,4'-oxydianiline, or derived from pyromellitic dianhydride, 4,4'-oxydianiline and paraphenylenediamine, or derived from 3,3',4,4'-biphenyl tetracarboxylic dianhydride, pyromellitic dianhydride, 4,4'-oxydianiline and paraphenylenediamine, or derived from i) blocks of pyromellitic dianhydride and 4,4'-oxydianiline and ii) blocks of pyromellitic dianhydride and paraphenylenediamine;
  c) adding at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and
  f) imidizing the composite formed in step d to produce a first polyimide layer and a second polyimide layer.

Another embodiment of the present disclosure is a method of reducing the amount of colorant in a multilayer film and achieving an L* color less than 30 and a 60 degree gloss value less than 10, the method comprising:
  a) providing a component selected from the group consisting of: a first polyimide layer, a first polyamic acid solution and a first polyamic acid green film;
  b) providing a second polyamic acid solution containing polyamic acid, silica matting agent, and submicron carbon black;
  c) adding 15 to 50 wt % of at least one submicron fumed metal oxide to the second polyamic acid solution;
  d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and f) imidizing the composite formed in step d to produce a first polyimide layer and a second polyimide layer.

Another embodiment of the present disclosure is a method of reducing the amount of colorant in a multilayer film and achieving an L* color less than 30 and a 60 degree gloss value less than 10, the method comprising:

a) providing a component selected from the group consisting of: a first polyimide layer, a first polyamic acid solution and a first polyamic acid green film and derived from pyromellitic dianhydride and 4,4'-oxydianiline, b) providing a second polyamic acid solution containing polyamic acid, silica matting agent, and submicron carbon black; wherein the polyamic acid is derived from pyromellitic dianhydride and 4,4'-oxydianiline, or derived from pyromellitic dianhydride, 4,4'-oxydianiline and paraphenylenediamine, or derived from 3,3', 4,4'-biphenyl tetracarboxylic dianhydride, pyromellitic dianhydride, 4,4'-oxydianiline and paraphenylenediamine, or derived from i) blocks of pyromellitic dianhydride and 4,4'-oxydianiline and ii) blocks of pyromellitic dianhydride and paraphenylenediamine;

c) adding 15 to 50 wt % of at least one submicron fumed metal oxide to the second polyamic acid solution;

d) forming a multilayer composite by coating the polyamic acid solution formed in step c on to the first polyimide layer, or coating the polyamic acid solution formed in step c on to the first polyamic acid green film, or coextruding the polyamic acid solution formed in step c and the first polyamic acid solution; and f) imidizing the composite formed in step d to produce a first polyimide layer and a second polyimide layer.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. Numerical values are to be understood to have the precision of the number of significant figures provided. For example, the number 1 shall be understood to encompass a range from 0.5 to 1.4, whereas the number 1.0 shall be understood to encompass a range from 0.95 to 1.04, including the end points of the stated ranges. It is not intended that the scope of the invention be limited to the specific values recited when defining a range.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

The materials, methods, and examples herein are illustrative only and, except as specifically stated, are not intended to be limiting. Although methods and materials similar or equivalent to those described herein can be used, suitable methods and materials are described herein.

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

EXAMPLES

Illustrative preparations and evaluations of films are described below.

Silica Slurry #1 (Syloid® C807):

A silica slurry was prepared, consisting of 75.4 wt % DMAC, 9.6 wt PMDA/4,4'ODA polyamic acid prepolymer solution (20.6 wt % polyamic acid solids in DMAC) and 15.0 wt % silica powder (Syloid® C 807, from W. R. Grace Co.). The ingredients were thoroughly mixed in a high shear rotor-stator type mixer. Median particle size was 7 microns.

Silica Slurry #2 (Sipernat® 500LS):

A silica slurry was prepared as in Silica slurry #1, except using Sipernat® 500LS powder, from Evonik, instead of Syloid® C807. Median particle size was 6 microns.

Fumed Metal Oxide Silica Slurries:

Aerosil® OX50, Aersosil® 200, and Aerosil® R8200 are fumed silicas. Aeroxide® T805 is a fumed titanium dioxide, Aerosil® MOX 80 is a mixed fumed oxide of silica and alumina, Aeroxide® Alu 65 and Aeroxide® Alu C805 are fumed aluminas. All fumed metal oxide powders were obtained from Evonik. Slurries of the fumed metal oxides were prepared as described below.

Aerosil® OX50, Aerosil® 200, Aerosil® R8200, Aerosil® MOX 80, Aeroxide® Alu 65, and Aeroxide® T805 slurries were prepared, each consisting of 78.9 wt. % DMAC, 17.6 wt. % fumed metal oxide powder, and 3.5 wt. % dispersing agent (Disperbyk 180, from Byk Chemie). The ingredients were thoroughly mixed in a high shear disperser. The slurries were then processed in a bead mill to disperse any agglomerates and to achieve the desired particle size, as shown in Table 1. Due to the tendency of the Aerosil® 200, Aeosil® R8200, and Aerosil® MOX80 particles to flocculate, it was not possible to accurately measure particle size of these milled slurries by the laser diffraction method (as described below). Examples 18, 19 and 20 particle size measurements while in slurry were measured to be slightly over 1 micron. Vendor information gives the primary particle size of these fumed metal oxides as 12 nm for Aerosil® 200 and Aeosil® R8200, and 30 nm for Aerosil® MOX80. In addition, observation of the milled slurries in an optical microscope showed that the particle size was well below 1 micron.

Aeroxide® Alu C805 fumed alumina slurry was prepared, consisting of 76.3 wt. % DMAC, 19.8 wt. % fumed alumina powder, and 3.9 wt. dispersing agent (Disperbyk 180, from Byk Chemie). The ingredients were thoroughly mixed in a high speed disc-type disperser. The slurry was then processed in a bead mill to disperse any agglomerates and to achieve the desired particle size. Median particle size was 0.3 microns.

Colloidal Silica Slurry:

A colloidal slurry was prepared from aqueous colloidal silica (20 nm particle size) by solvent transfer to DMAC, followed by distillation to remove the water. Silica concentration was 34.7 wt. %.

Nano Zirconia Slurry:

A slurry containing 50 wt. % ZrO2 in DMAC was used (PC-12-50, from Pixelligent Technologies, LLC). Particle size was 8 nm, as measured by the manufacturer using a dynamic light scattering method.

Carbon Black Slurry #1 (SB4 Carbon):

A carbon black slurry was prepared, consisting of 80 wt. % DMAC, 10 wt. % PMDA/4,4'ODA polyamic acid prepolymer solution (20.6 wt. % polyamic acid solids in DMAC), and 10 wt. % carbon black powder (Special Black 4, from Orion Engineered Carbons LLC). The ingredients were thoroughly mixed in a high speed disc-type disperser. The slurry was then processed in a bead mill to disperse any agglomerates and to achieve the desired particle size. Median particle size was 0.3 microns.

Carbon Black Slurry #2 (SB6 Carbon):

A carbon black slurry was prepared, consisting of 82 wt. % DMAC, 12 wt. % carbon black powder (Special Black 6, from Orion Engineered Carbons LLC), and 6 wt. % dispersing agent (Byk 9077, from Byk Chemie). The ingredients were thoroughly mixed in a high speed disc-type disperser. The slurry was then processed in a bead mill to disperse any agglomerates and to achieve the desired particle size. Median particle size was 0.14 microns.

Alpha Alumina Slurry

An alumina slurry was prepared, consisting of 41.7 wt % DMAC, 23.3 wt PMDA/4,4'ODA polyamic acid prepolymer solution (20.6 wt % polyamic acid solids in DMAC), and 35.0 wt % alpha alumina powder with median particle size of approximately 3 microns. The ingredients were thoroughly mixed in a high shear rotor-stator type mixer.

Barium Sulfate Slurry:

A synthetic barium sulfate (Blanc Fixe F, from Sachtleben Chemie GmbH) slurry was prepared, consisting of 51.7 wt % DMAC, 24.1 wt PMDA/4,4'ODA polyamic acid prepolymer solution (20.6 wt % polyamic acid solids in DMAC) and 24.1 wt. % barium sulfate powder. The ingredients were thoroughly mixed in a high shear rotor-stator type mixer. Median particle size was 1.3 microns.

Black Pigment Slurry:

A black pigment slurry was prepared by first dissolving 1.52 grams of a dispersing agent (Byk 9077) in 38.9 grams of DMAC, then blending in 15.55 grams of a perylene black pigment (Paliogen® Black L0086, pigment black 32, from BASF) and processing for 10 minutes with an ultrasonic processor (Sonics & Materials, Inc., Model VCX-500) in order to deagglomerate the pigment.

Black Dye Slurry:

A black dye slurry was prepared by dissolving 12.0 grams of a black dye powder (Neozapon Black X55, solvent black 29, from BASF) in 28.0 grams of DMAC.

Blue Dye Slurry:

A blue dye slurry was prepared by dissolving 12.0 grams of a blue dye powder (Neozapon Blue 807, solvent blue 70, from BASF) in 28.0 grams of DMAC.

Ultramarine Blue Pigment Slurry:

A blue pigment slurry was prepared by first dispersing 7.5 grams of ultramarine blue pigment (Nubiola FP-40, from Nubiola) in 38.9 grams of DMAC, and processing for 10 minutes with an ultrasonic processor (Sonics & Materials, Inc., Model VCX-500) in order to deagglomerate the pigment. The dispersion was then mixed with 3.6 grams of a PMDA/4,4'ODA polyamic acid prepolymer solution (20.6 wt % polyamic acid solids in DMAC).

Phthalocyanine Blue Pigment Slurry:

A blue pigment slurry was prepared by first dispersing 16.67 grams of a copper phthalocyanine blue pigment (Heliogen® Blue L6700F, pigment blue 15:6, from BASF) in 38.9 grams of DMAC, and processing for 10 minutes with an ultrasonic processor (Sonics & Materials, Inc., Model VCX-500) in order to deagglomerate the pigment.

Kapton® MBC is an opaque matte black polyimide film manufactured by DuPont. It is based on PMDA/4,4'ODA polyimide, and contains approximately 5 wt. % low conductivity carbon black and approximately 2 wt. % of a silica matting agent. It is available in various thicknesses.

PMDA/4,4'ODA and BPDA/PMDA/PPD/4,4'ODA (92/8/95/5 Mole Ratio)

polyamic acids solutions in DMAC were prepared by conventional means, with excess diamine, to a viscosity of 50-100 Poise. PMDA/4,4'ODA polymer was 20.6% polyamic acid solids. BPDA/PMDA/PPD/4,4'ODA was 14.5% solids.

PMDA/4,4'ODA/PPD (100/70/30 Mole Ratio) Co-Polyamic Acid Solution #1:

PPD was dissolved in DMAC at 40-45° C. to a concentration of approximately 2.27 wt. %. After reducing the temperature to 30-40° C., solid PMDA was added, with agitation, to achieve a PMDA:PPD stoichiometric ratio of approximately 0.99:1. The mixture was allowed to react for 90 minutes, with agitation. The mixture was diluted to approximately 5.8-6.5% solids by addition of DMAC. 4,4'ODA was then added, to achieve a 4,4'ODA:PPD mole ratio of 70:30, and allowed to react for approximately 30 minutes at 40-45° C. Solid PMDA was incrementally added, with agitation, and allowed to react for approximately 2 hours at 40-45° C., to achieve a polymer viscosity of 75-250 Poise. Polyamic acid solids was 19.5%-20.5%. The polymer solution was stored in a refrigerator until use.

PMDA/4,4'ODA/PPD (100/70/30 Mole Ratio) Co-Polyamic Acid Solution #2:

PPD was added to DMAC at 40-45° C., with agitation, quickly followed by addition of 4,4'ODA to achieve a 4,4'ODA:PPD mole ratio of 70:30. The mixture was allowed to dissolve for approximately 30 minutes. Solid PMDA was added, incrementally with agitation, to achieve a PMDA: Total Diamine stoichiometric ratio of approximately 0.99:1. The mixture was allowed to react for approximately 2 hours at 40-45° C. to achieve a polymer viscosity of 75-250 Poise. Polyamic acid solids were approximately 20%. The polymer solution was stored in a refrigerator until use.

PMDA/4,4'ODA/PPD (100/60/40 Mole Ratio) Co-Polyamic Acid Solution #3:

PPD was added to DMAC at 40-45° C., with agitation, quickly followed by addition of 4,4'ODA to achieve a 4,4'ODA:PPD mole ratio of 60:40. The mixture was allowed to dissolve for approximately 30 minutes. Solid PMDA was added, incrementally with agitation, to achieve a PMDA: Total Diamine stoichiometric ratio of approximately 0.99:1. The mixture was allowed to react for approximately 2 hours at 40-45° C. to achieve a polymer viscosity of 75-250 Poise. Polyamic acid solids were approximately 20%. The polymer solution was stored in a refrigerator until use.

Preparation on Multilayer Film Examples 1 Through 25 and Comparative Multilayer Film Examples C1 Through C13 and C19 Through C26:

The first polyimide layer comprised Kapton® MBC film, as indicated in Tables 1 and 2.

The second polyimide layer was prepared using the filler slurries as described above and indicated in Tables 1 and 2. The slurries were thoroughly mixed with polyamic acid solution, described above and indicated in Tables 1 and 2, in the appropriate ratio to produce the desired composition after curing. The resulting mixture was coated onto the First polyimide layer using a stainless steel casting rod. The coating was dried on a hot plate at 100° C. until dry by visual inspection. The resulting multilayer film was then placed on a pin frame to hold it flat, and placed in a 120° C. oven. The oven temperature was ramped to 320° C. over a period of 45 to 60 minutes, then transferred to a 400° C. oven and held for 5 minutes, then removed from the oven and allowed to cool.

Comparative Single Layer Film Examples C14 Through C18 were Prepared as Follows:

A polyamic acid solution, as described above and indicated in Table 1, was finished by incrementally adding, with mixing, a 6 wt. % solution of PMDA in DMAC, to achieve a final viscosity of 2500-3000 Poise. Filler slurries as described above and indicated in Table 1, were mixed with the finished polyamic acid solution in appropriate amounts to produce the desired composition after curing. The finished polymer mixture was degassed. Using a stainless steel casting rod, the polymer mixture was manually cast onto a Mylar® polyethylene terephthalate sheet attached to a glass plate. The Mylar® polyethylene terephthalate sheet containing the wet cast film was immersed in a bath consisting of a 50/50 mixture of 3-picoline and acetic anhydride. The bath was gently agitated for a period of 3 to 4 minutes in order to effect imidization and gelation of the film. The gel film was peeled from the Mylar® polyethylene terephthalate sheet and placed on a pin frame to restrain the film and prevent shrinking. After allowing for residual solvent to drain from the film, the pin frame containing the film was placed in a 120° C. oven. The oven temperature was ramped to 320° C. over a period of 45 to 60 minutes, then transferred to a 400° C. oven and held for 5 minutes, then removed from the oven and allowed to cool.

Compositions of the cured films were calculated from the composition of the components in the mixtures, excluding DMAC solvent (which is removed during curing) and accounting for removal of water during conversion of polyamic acid to polyimide.

The 60 degree gloss was measured using a Micro-TRI-gloss glossmeter (from BYK-Gardner).

The $L^*$ color was measured using a HunterLab ColorQuest® XE color meter (Hunter Associates Laboratory, Inc.) in the reflectance, specular included mode. The instrument was standardized prior to each use. Color data from the instrument were reported in the CIELAB 10°/D65 system, as $L^*$, $a^*$, $b^*$. A $L^*$ value of 0 is pure black, while a $L^*$ value of 100 is pure white. Typically, a $L^*$ value difference of 1 unit is discernible to the eye.

Particle size of filler particles in the slurries was measured by laser diffraction using either a Horiba LA-930 (Horiba, Instruments, Inc., Irvine Calif.) or a Malvern Mastersizer 3000 (Malvern Instruments, Inc., Westborough, Mass.) particle size analyzer. DMAC was used as the carrier fluid.

Alcohol wipe test: The film was wiped 3 times with a towel which was wetted with isopropyl alcohol. A "Fail" grade was given if any colorant was observed to transfer from the film to the towel. This test is a measure of the suitability of the film with respect to durability to processing conditions for electronic circuit manufacture.

Examples 1 through 25 are illustrative of the invention. The examples illustrate various concentrations of submicron carbon black, matting agent, fumed metal oxides, and polyimide within the inventive ranges for the second polyimide layer. The examples also illustrate various thicknesses of the second polyimide layer.

Examples 6 through 23, 24 and 25 illustrate a different type of silica matting agents in the second polyimide layer compared to Examples 1 through 5.

Example 23 illustrates a mixture of silica and polyimide particle matting agents in the second polyimide layer.

Examples 3 and 8 illustrate a different type of sub-micron carbon black in the second polyimide layer.

Examples 7, 8, 24 and 25 illustrate different aromatic polyimides in the second polyimide layer Examples 1 through 13, 22 through 25 illustrate different types and amounts of fumed alumina in the second polyimide layer.

Examples 14 through 19 illustrate different types and amounts of fumed silica in the second polyimide layer.

Example 20 illustrates a fumed mixed metal oxide in the second polyimide layer.

Example 21 illustrates a fumed titanium dioxide in the second polyimide layer.

Comparative examples C1 through C6 illustrate that when the percentage of polyimide in the second polyimide layer increases above 50 wt. % the $L^*$ color is greater than 30.

Comparative examples C7 and C8 illustrate that when the percentage of polyimide in the second polyimide layer is less than 25 wt. % the second polyimide layer fails the alcohol wipe test and easily flakes off, due to the low polyimide content.

Comparative example C9, C20 and C21 illustrate that when no matting agent is present in the second polyimide layer the 60 degree gloss is greater than 10.

Comparative example C19 illustrates that when no carbon black is present in the second polyimide layer the $L^*$ color is greater than 30.

Comparative examples C10 and C11 illustrate that with non-fumed nano sized zirconia or silica fillers in the second polyimide layer the $L^*$ color is greater than 30.

Comparative examples C12 and C13 illustrate that when fillers with a median particle size larger than 1 micron are used in the second polyimide layer the $L^*$ color is greater than 30.

Comparative examples C14 through C18 illustrate that single layer polyimide films of the same composition as the second polyimide layer of the multilayer films exhibit $L^*$ color greater than 30. Additionally, the single layer films are too brittle to be manufacturable or of practical use. Results are shown in table 1.

Comparative examples C22 through C26 illustrate that when a pigment or dye is used in the second polyimide layer and there is no carbon black in the second layer, the multilayer film either fails the alcohol wipe test, exhibits $L^*$ color greater than 30 or a exhibits 60 degree gloss greater than 10.

Results are shown in table 2.

TABLE 1

| | First PI Layer | 2nd PI layer | | | | | First PI layer Thickness (microns) | Second PI layer Thickness (microns) |
|---|---|---|---|---|---|---|---|---|
| | | carbon black | matting agent | other filler | other filler D50 (microns) | PI | | |
| 1 | MBC | SB6 | Sipernat 500LS | fumed alumina (Alu C805) | 0.3 | PMDA/ODA/PPD #1 | 25 | 4 |
| 2 | MBC | SB6 | Sipernat 500LS | fumed alumina (Alu C805) | 0.3 | PMDA/ODA/PPD #1 | 25 | 6 |
| 3 | MBC | SB4 | Sipernat 500LS | fumed alumina (Alu C805) | 0.3 | PMDA/ODA/PPD #1 | 25 | 3 |
| 4 | MBC | SB6 | Sipernat 500LS | fumed alumina (Alu C805) | 0.3 | PMDA/ODA/PPD #1 | 25 | 4 |
| 5 | MBC | SB6 | Sipernat 500LS | fumed alumina (Alu C805) | 0.3 | PMDA/ODA/PPD #1 | 25 | 6 |
| 6 | MBC | SB6 | Syloid C807 | fumed alumina (Alu C805) | 0.3 | PMDA/ODA/PPD #1 | 25 | 5 |
| 7 | MBC | SB6 | Syloid C807 | fumed alumina (Alu C805) | 0.3 | BPDA/PMDA/PPD/4,4'ODA | 25 | 5 |
| 8 | MBC | SB4 | Syloid C807 | fumed alumina (Alu C805) | 0.3 | PMDA/ODA | 25 | 4 |
| 9 | MBC | SB6 | Syloid C807 | fumed alumina (Alu C805) | 0.3 | PMDA/ODA/PPD #1 | 25 | 5 |
| 10 | MBC | SB6 | Syloid C807 | fumed alumina (Alu C805) | 0.3 | PMDA/ODA/PPD #1 | 25 | 3 |
| 11 | MBC | SB6 | Syloid C807 | fumed alumina (Alu C805) | 0.3 | PMDA/ODA/PPD #1 | 25 | 5 |
| 12 | MBC | SB6 | Syloid C807 | fumed alumina (Alu C805) | 0.3 | PMDA/ODA/PPD #1 | 25 | 9 |
| 13 | MBC | SB6 | Syloid C807 | fumed alumina (Alu C805) | 0.3 | PMDA/ODA/PPD #1 | 25 | 8 |
| 14 | MBC | SB6 | Syloid C807 | fumed silica (Aerosil* OX50) | 0.6 | PMDA/ODA/PPD #1 | 25 | 1 |
| C1 | MBC | SB6 | Syloid C807 | fumed alumina (Alu C805) | 0.3 | PMDA/ODA/PPD #1 | 25 | 2 |
| C2 | MBC | SB6 | Syloid C807 | fumed alumina (Alu C805) | 0.3 | PMDA/ODA/PPD #1 | 25 | 3 |
| C3 | MBC | SB6 | Syloid C807 | fumed alumina (Alu C805) | 0.3 | PMDA/ODA/PPD #1 | 25 | 2 |
| C4 | MBC | SB6 | Syloid C807 | fumed alumina (Alu C805) | 0.3 | PMDA/ODA/PPD #1 | 25 | 2 |
| C5 | MBC | SB6 | Syloid C807 | fumed alumina (Alu C805) | 0.3 | PMDA/ODA/PPD #1 | 25 | 2 |
| C6 | MBC | SB6 | Syloid C807 | fumed alumina (Alu C805) | 0.3 | PMDA/ODA/PPD #1 | 25 | 1 |
| C7 | MBC | SB6 | Syloid C807 | fumed alumina (Alu C805) | 0.3 | PMDA/ODA/PPD #1 | 25 | 18 |
| C8 | MBC | SB6 | Syloid C807 | fumed alumina (Alu C805) | 0.3 | PMDA/ODA/PPD #1 | 25 | 4 |
| C9 | MBC | SB4 | — | fumed alumina (Alu C805) | 0.3 | PMDA/ODA | 25 | 6 |

TABLE 1-continued

| | | | | | | | | |
|---|---|---|---|---|---|---|---|---|
| C10 | MBC | SB6 | Syloid C807 | nano zirconia | 0.008 | PMDA/ODA/PPD #1 | 25 | 2 |
| C11 | MBC | SB6 | Syloid C807 | colloidal silica | 0.02 | PMDA/ODA/PPD #1 | 25 | 1 |
| C12 | MBC | SB4 | Syloid C807 | alpha alumina | 3 | PMDA/ODA | 25 | 7 |
| C13 | MBC | SB4 | Syloid C807 | BaSO4 | 1.3 | PMDA/ODA | 25 | 9 |
| C14 | single layer | SB6 | Syloid C807 | fumed alumina (Alu C805) | 0.3 | PMDA/ODA/PPD #1 | 61 | |
| C15 | single layer | SB6 | Sipernat 500LS | fumed alumina (Alu C805) | 0.3 | PMDA/ODA/PPD #1 | 68 | |
| C16 | single layer | SB6 | Sipernat 500LS | fumed alumina (Alu C805) | 0.3 | PMDA/ODA/PPD #1 | 58 | |
| C17 | single layer | SB6 | Sipernat 500LS | fumed alumina (Alu C805) | 0.3 | PMDA/ODA/PPD #1 | 61 | |
| C18 | single layer | SB6 | Sipernat 500LS | fumed alumina (Alu C805) | 0.3 | PMDA/ODA/PPD #1 | 66 | |
| C19 | MBC | — | Syloid C807 | fumed alumina (Alu C805) | 0.3 | PMDA/ODA/PPD #1 | 25 | 4 |
| C20 | MBC | SB6 | — | fumed alumina (Alu C805) | 0.3 | PMDA/ODA/PPD #1 | 25 | 0.6 |
| C21 | MBC | SB6 | — | fumed alumina (Alu C805) | 0.3 | PMDA/ODA/PPD #1 | 25 | 2 |
| 15 | MBC | SB6 | Syloid C807 | fumed silica (Aerosil OX50) | 0.8 | PMDA/ODA/PPD #1 | 25 | 1 |
| 16 | MBC | SB6 | Syloid C807 | fumed silica (Aerosil OX50) | 0.8 | PMDA/ODA/PPD #1 | 25 | 1 |
| 17 | MBC | SB6 | Syloid C807 | fumed silica (Aerosil OX50) | 0.8 | PMDA/ODA/PPD #1 | 25 | 3 |
| 18 | MBC | SB6 | Syloid C807 | fumed silica (Aerosil 200) | 1.03* | PMDA/ODA/PPD #1 | 25 | 1 |
| 19 | MBC | SB6 | Syloid C807 | fumed silica (Aerosil R8200) | 1.32* | PMDA/ODA/PPD #1 | 25 | 0.6 |
| 20 | MBC | SB6 | Syloid C807 | fumed alumina/ silica (Aerosil MOX80) | 1.58* | PMDA/ODA/PPD #1 | 25 | 0.9 |
| 21 | MBC | SB6 | Syloid C807 | Fumed titania (Aeroxide T805) | 0.995 | PMDA/ODA/PPD #1 | 25 | 3 |
| 22 | MBC | SB6 | Syloid C807 | fumed alumina (Alu 65) | 0.987 | PMDA/ODA/PPD #1 | 25 | 3 |
| 23 | MBC | SB6 | Syloid C807/PI (6/3) | fumed alumina (Alu C805) | 0.3 | PMDA/ODA/PPD #1 | 25 | 2 |
| 24 | MBC | SB6 | Syloid C807 | fumed alumina (Alu C805) | 0.3 | PMDA/ODA/PPD #2 | 25 | 2 |
| 25 | MBC | SB6 | Syloid C807 | fumed alumina (Alu C805) | 0.3 | PMDA/ODA/PPD #3 | 25 | 3 |

TABLE 1-continued

|  | 2nd PI layer | | | | | | | Other filler primary |
|---|---|---|---|---|---|---|---|---|
|  | wt % carbon black | wt % matting agent | wt % PI | wt % other filler | alcohol wipe test | L* | 60° gloss | particle size (nm) |
| 1 | 4 | 9 | 38 | 40 | pass | 27.7 | 4.2 | 13 |
| 2 | 4 | 9 | 34 | 43 | pass | 25.4 | 3.2 | 13 |
| 3 | 4 | 9 | 30 | 46 | pass | 25.6 | 3.6 | 13 |
| 4 | 4 | 12 | 39 | 36 | pass | 28.0 | 2.6 | 13 |
| 5 | 4 | 12 | 36 | 38 | pass | 25.9 | 2.2 | 13 |
| 6 | 4 | 7 | 32 | 46 | pass | 26.3 | 2.7 | 13 |
| 7 | 4 | 9 | 30 | 46 | pass | 23.9 | 1.6 | 13 |
| 8 | 3 | 17 | 50 | 25 | pass | 29.3 | 1.8 | 13 |
| 9 | 4 | 9 | 43 | 34 | pass | 23.3 | 2.3 | 13 |
| 10 | 8 | 6 | 27 | 46 | pass | 19.8 | 3.4 | 13 |
| 11 | 16 | 11 | 34 | 26 | pass | 23.0 | 1.7 | 13 |
| 12 | 13 | 8 | 38 | 29 | pass | 24.8 | 2.8 | 13 |
| 13 | 11 | 17 | 47 | 17 | pass | 28.2 | 1.4 | 13 |
| 14 | 3 | 6 | 41 | 41 | pass | 29.4 | 3.8 | 40 |
| C1 | 4 | 8 | 81 | 5 | pass | 34.2 | 17.2 | 13 |
| C2 | 12 | 7 | 68 | 5 | pass | 32.7 | 10.2 | 13 |
| C3 | 4 | 8 | 67 | 17 | pass | 33.0 | 14.8 | 13 |
| C4 | 12 | 8 | 54 | 17 | pass | 30.8 | 6.3 | 13 |
| C5 | 11 | 16 | 55 | 11 | pass | 30.3 | 2.5 | 13 |
| C6 | 4 | 8 | 51 | 29 | pass | 31.2 | 13.9 | 13 |
| C7 | 12 | 12 | 19 | 42 | fail | 15.2 | 0.5 | 13 |
| C8 | 12 | 18 | 13 | 42 | fail | 16.9 | 0.6 | 13 |
| C9 | 3.6 | 0 | 43 | 44 | pass | 29.3 | 47.6 | 13 |
| C10 | 3 | 7 | 52 | 36 | pass | 34.8 | 16.6 | 8 |
| C11 | 3 | 7 | 52 | 36 | pass | 30.4 | 18.5 | 20 |
| C12 | 3 | 15 | 60 | 22 | pass | 32.5 | 1.8 |  |
| C13 | 3 | 15 | 60 | 22 | pass | 32.7 | 1.9 |  |
| C14 | 4 | 7 | 32 | 46 | pass | 37.5 | 1.7 | 13 |
| C15 | 4 | 9 | 38 | 40 | pass | 38.5 | 1.4 | 13 |
| C16 | 4 | 9 | 34 | 43 | pass | 40.5 | 1.8 | 13 |
| C17 | 4 | 12 | 39 | 36 | pass | 38.3 | 1.0 | 13 |
| C18 | 4 | 12 | 36 | 38 | pass | 36.6 | 0.9 | 13 |
| C19 | 0 | 12 | 45 | 36 | pass | 37.8 | 3.1 | 13 |
| C20 | 4 | 0 | 51 | 36 | pass | 31.6 | 17 | 13 |
| C21 | 5 | 0 | 49 | 36 | pass | 32.2 | 24 | 13 |
| 15 | 8 | 6 | 50 | 26 | pass | 28.2 | 3.5 | 40 |
| 16 | 8 | 6 | 41 | 34 | pass | 25.2 | 2.3 | 40 |
| 17 | 8 | 6 | 27 | 46 | pass | 18.9 | 1.2 | 40 |
| 18 | 8 | 6 | 41 | 34 | pass | 29.8 | 2.3 | 12 |
| 19 | 8 | 6 | 41 | 34 | pass | 27.3 | 7.3 | 12 |
| 20 | 8 | 6 | 41 | 34 | pass | 27.7 | 7.3 | 30 |
| 21 | 8 | 6 | 41 | 34 | pass | 23.5 | 3.7 | 21 |
| 22 | 8 | 6 | 41 | 34 | pass | 20.9 | 3.5 | 17 |
| 23 | 4 | 9 | 33 | 43 | pass | 24.89 | 5.6 |  |
| 24 | 4 | 8 | 38 | 40 | pass | 25.3 | 3.8 | 13 |
| 25 | 4 | 8 | 38 | 40 | pass | 28.2 | 4.3 | 13 |

TABLE 2

|  | First PI Layer | 2nd PI layer | | | | | First PI layer | Second PI layer |
|---|---|---|---|---|---|---|---|---|
|  |  | carbon black | Pigment/Dye | matting agent | other filler | other filler D50 (microns) | PI |  |  |
| C22 | MBC | — | Paliogen black L00086 | Syloid C807 | fumed alumina | 0.3 | PMDA/ODA/PPD #1 | 25 | 2 |
| C23 | MBC | — | Neozapon black X55 | Syloid C807 | fumed alumina | 0.3 | PMDA/ODA/PPD #1 | 25 | 0.6 |
| C24 | MBC | — | Neozapon blue 807 | Syloid C807 | fumed alumina | 0.3 | PMDA/ODA/PPD #1 | 25 | 2 |
| C25 | MBC | — | Nubiola FP-40 | Syloid C807 | fumed alumina | 0.3 | PMDA/ODA/PPD #1 | 25 | 1 |
| C26 | MBC | — | Helogen Blue L6700F | Syloid C807 | fumed alumina | 0.3 | PMDA/ODA/PPD #1 | 25 | 1 |

TABLE 2-continued

|  | wt % carbon black | Wt % pigment/ dye | wt % matting agent | wt % PI | wt % other filler | alcohol wipe test | L* | 60° gloss | Other filler primary particle size (nm) (vender) |
|---|---|---|---|---|---|---|---|---|---|
| C22 | 0 | 25 | 9 | 32 | 26 | fail | 27.7 | 5.9 | 13 |
| C23 | 0 | 10 | 9 | 39 | 35 | pass | 30.3 | 13.5 | 13 |
| C24 | 0 | 10 | 9 | 39 | 35 | pass | 32.3 | 5.6 | 13 |
| C25 | 0 | 25 | 9 | 35 | 26 | pass | 31.4 | 1.1 | 13 |
| C26 | 0 | 25 | 9 | 35 | 26 | fail | 26.8 | 3.9 | 13 |

The materials, methods, and examples herein are illustrative only and, except as specifically stated, are not intended to be limiting. Although methods and materials similar or equivalent to those described herein can be used in the practice or testing of the present invention, suitable methods and materials are described herein.

Note that not all of the activities described above in the general description or the examples are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification is to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A multilayer film comprising:
    a. a first polyimide layer from 8 to 130 microns thick comprising: a polyimide derived from at least 50 mole percent of an aromatic dianhydride, based upon a total dianhydride content of the polyimide, and at least 50 mole percent of an aromatic diamine based upon a total diamine content of the polyimide;
    b. a second polyimide layer from 0.5 to 20 microns thick in direct contact with the first polyimide layer, the second polyimide layer comprising:
        i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
        ii) greater than 0 and less than 20 wt % of a silica matting agent or a mixture of silica matting agent with at least one additional matting agent;
        iii) greater than 0 and less than 20 wt % of at least one submicron carbon black;
        iv) 15 to 50 wt % of at least one submicron fumed metal oxide; and
    wherein the multilayer film has an L* color less than 30 and a 60 degree gloss value less than 10.

2. The multilayer film in accordance with claim 1, the first polyimide layer further comprising:
    i) 2 to 9 wt % low conductivity carbon black;
    ii) a matting agent that:
        a. is present in an amount from 1.6 to 10 weight percent,
        b. has a median particle size from 1.3 to 10 microns, and
        c. has a density from 2 to 4.5 g/cc.

3. The multilayer film in accordance with claim 1, wherein the polyimide of the second polyimide layer is derived from pyromellitic dianhydride and 4,4'-oxydianiline or derived from pyromellitic dianhydride, 4,4'-oxydianiline and paraphenylenediamine.

4. The multilayer film in accordance with claim 1, wherein the polyimide of the second polyimide layer is derived from i) blocks of pyromellitic dianhydride and 4,4'-oxydianiline and ii) blocks of pyromellitic dianhydride and paraphenylenediamine.

5. The multilayer film in accordance with claim 1, wherein the polyimide of the first polyimide layer is derived from pyromellitic dianhydride and 4,4'-oxydianiline, and wherein the polyimide of the second polyimide layer is derived from
    i) pyromellitic dianhydride and 4,4'-oxydianiline,
    ii) pyromellitic dianhydride, 4,4'-oxydianiline and paraphenylenediamine,
    iii) blocks of pyromellitic dianhydride and 4,4'-oxydianiline and blocks of pyromellitic dianhydride and paraphenylenediamine, or
    iv) 3,3',4,4'-biphenyl tetracarboxylic dianhydride, pyromellitic dianhydride, 4,4'-oxydianiline and paraphenylenediamine.

6. The multilayer film in accordance with claim 1, further comprising a third polyimide layer from 0.5 to 20 microns thick in direct contact with the first polyimide layer opposite the second polyimide layer, the third polyimide layer comprising:
    i) 25 to 50 wt % of a polyimide derived from at least 50 mole percent of an aromatic dianhydride, based upon a total dianhydride content of the polyimide, and at least 50 mole percent of an aromatic diamine based upon a total diamine content of the polyimide;
    ii) greater than 0 and less than 20 wt % of a silica matting agent or a mixture of silica matting agent with at least one additional matting agent;

iii) greater than 0 and less than 20 wt % of at least one submicron carbon black; and iv) 15 to 50 wt % of at least one submicron fumed metal oxide.

7. The multilayer film in accordance with claim 1 wherein the submicron fumed metal oxide is fumed alumina, fumed silica or mixtures thereof.

8. The multilayer film in accordance with claim 1, the first polyimide layer further comprising:

i) 1 to 15 wt % low conductivity carbon black, or ii) 1 to 40 wt % pigment or dye.

9. The multilayer film in accordance with claim 8, the first polyimide layer further comprising 1 to 20 wt % of a matting agent selected from silica, alumina, zirconia, boron nitride, barium sulfate, polyimide particles, calcium phosphate, talc or mixtures thereof.

10. The multilayer film in accordance with claim 8, the first polyimide layer further comprising 1 to 20 wt % of a matting agent that is a carbon black having a mean particle size from 2 to 9 micrometers.

11. The multilayer film in accordance with claim 8, the first polyimide layer further comprising 1 to 20 wt % of a matting agent, the matting agent being a mixture of i) carbon black having a mean particle size from 2 to 9 microns; and ii) silica, alumina, zirconia, boron nitride, barium sulfate, polyimide particles, calcium phosphate, talc or mixtures thereof.

12. The multilayer film in accordance with claim 1, further comprising an adhesive layer in direct contact with the first polyimide layer opposite the second polyimide layer.

13. The multilayer film in accordance with claim 12, wherein the adhesive layer is an epoxy resin selected from the group consisting of: Bisphenol A type epoxy resin, cresol novolac type epoxy resin, phosphorus containing epoxy resin, and mixtures thereof.

14. The multilayer film in accordance with claim 1, further comprising a third polyimide layer from 0.5 to 20 microns thick in direct contact with the first polyimide layer opposite the second polyimide layer, the third polyimide layer comprising:

i) a polyimide derived from at least 50 mole percent of an aromatic dianhydride, based upon a total dianhydride content of the polyimide, and at least 50 mole percent of an aromatic diamine based upon a total diamine content of the polyimide; and ii) a matting agent or mixture thereof.

15. The multilayer film in accordance with claim 14, wherein the matting agent in the third polyimide layer is selected from silica, alumina, zirconia, boron nitride, barium sulfate, polyimide particles, calcium phosphate, talc or mixtures thereof.

16. The multilayer film in accordance with claim 14, wherein the matting agent in the third polyimide layer is a carbon black having a mean particle size from 2 to 9 microns.

17. The multilayer film in accordance with claim 14, wherein the matting agent in the third polyimide layer is a mixture of i) carbon black having a mean particle size from 2 to 9 microns; and ii) silica, alumina, zirconia, boron nitride, barium sulfate, polyimide particles, calcium phosphate, talc or mixtures thereof.

18. The multilayer film in accordance with claim 14, further comprising an adhesive layer in direct contact with the second polyimide layer or the third polyimide layer on a surface of the second polyimide layer or the third polyimide layer opposite from the first polyimide layer.

19. The multilayer film in accordance with claim 14, the first polyimide layer further comprising:

i) 1 to 15 wt % low conductivity carbon black, or ii) 1 to 40 wt % pigment or dye.

20. The multilayer film in accordance with claim 19, the first polyimide layer further comprising 1 to 20 wt % of a matting agent selected from silica, alumina, zirconia, boron nitride, barium sulfate, polyimide particles, calcium phosphate, talc or mixtures thereof.

21. The multilayer film in accordance with claim 19, the first polyimide layer further comprising 1 to 20 wt % of a matting agent that is a carbon black having a mean particle size from 3 to 9 micrometers.

22. The multilayer film in accordance with claim 19, the first polyimide layer further comprising a matting agent mixture of i) carbon black having a mean particle size from 2 to 9 microns; and ii) silica, alumina, zirconia, boron nitride, barium sulfate, polyimide particles, calcium phosphate, talc or mixtures thereof.

* * * * *